Sept. 12, 1933.  E. T. TURNER  1,926,505
WATER SOFTENING MECHANISM
Filed Oct. 13, 1924   4 Sheets-Sheet 1

INVENTOR.
EDWARD T. TURNER.
ATTORNEY.

Sept. 12, 1933.  E. T. TURNER  1,926,505

WATER SOFTENING MECHANISM

Filed Oct. 13, 1924  4 Sheets-Sheet 3

INVENTOR.
EDWARD T. TURNER.

ATTORNEY.

Sept. 12, 1933.  E. T. TURNER  1,926,505
WATER SOFTENING MECHANISM
Filed Oct. 13, 1924  4 Sheets-Sheet 4

INVENTOR.
EDWARD T. TURNER.
ATTORNEY.

Patented Sept. 12, 1933

1,926,505

UNITED STATES PATENT OFFICE 1,926,505

WATER SOFTENING MECHANISM

Edward T. Turner, Dayton, Ohio, assignor to General Water Treatment Corporation, New York, N. Y., a corporation of Delaware Application October 13, 1924. Serial No. 743,385

37 Claims. (Cl. 210—24)

This invention relates to water softening mechanism and more particularly to that type of water softener which employs as a softening agent a base exchange material, such as zeolite or glauconite. In the operation of such a softening device the water to be softened is passed through the softening agent, which gives up its normal base in exchange for the substances which harden the water, usually calcium and magnesium. When the operation is continued to such a point that the softening material has given up so much of its normal base that it will no longer properly soften the water the softening properties in the material are revived by subjecting the same to the action of a regenerating solution, such as salt water, which displaces the substances which have been taken up from the hard water and restores to the softening material its normal base. After the material has been properly regenerated it is then subjected to the action of fresh water to wash out the salt and foreign matter which may be contained therein. Obviously the water softening operation and the regenerating operation cannot take place simultaneously in the same container and consequently in the ordinary water softening mechanism the supply of soft water is interrupted during the period of regeneration. Further, the operation of such a water softening apparatus involves considerable work and attention on the part of the user.

One object of the present invention is to provide a water softening mechanism of the base exchange type which will provide at all times a continuous supply of soft water.

A further object of the invention is to provide a continuous water softening mechanism which will be simple in its construction, compact in arrangement and automatic in its operation and will require but little attention on the part of the user.

A further object of the invention is to provide in a water softening mechanism a plurality of individual water softening units which are of relatively small capacity and a part of which may be subjected to the regenerating and washing operations while another part thereof are operating to soften the water.

Other objects of the invention will appear as the mechanism is described in detail.

In the accompanying drawings

In these drawings I have illustrated one embodiment of my invention but it will be understood that this has been chosen for the purposes of illustration only and that the mechanism may take various forms and that the various parts thereof may be constructed and operated in various ways.

In carrying out the invention I have provided a series of water softening devices each constituting a complete water softening unit in itself, and each of these devices being of relatively small capacity. The operation of the mechanism is so controlled that the major part of these water softening devices will be caused to operate to soften water while another and smaller part thereof is being subjected to the action of the regenerating fluid and wash water to regenerate the water softening material and to restore the water softening device to an operative condition.

Figure 1:
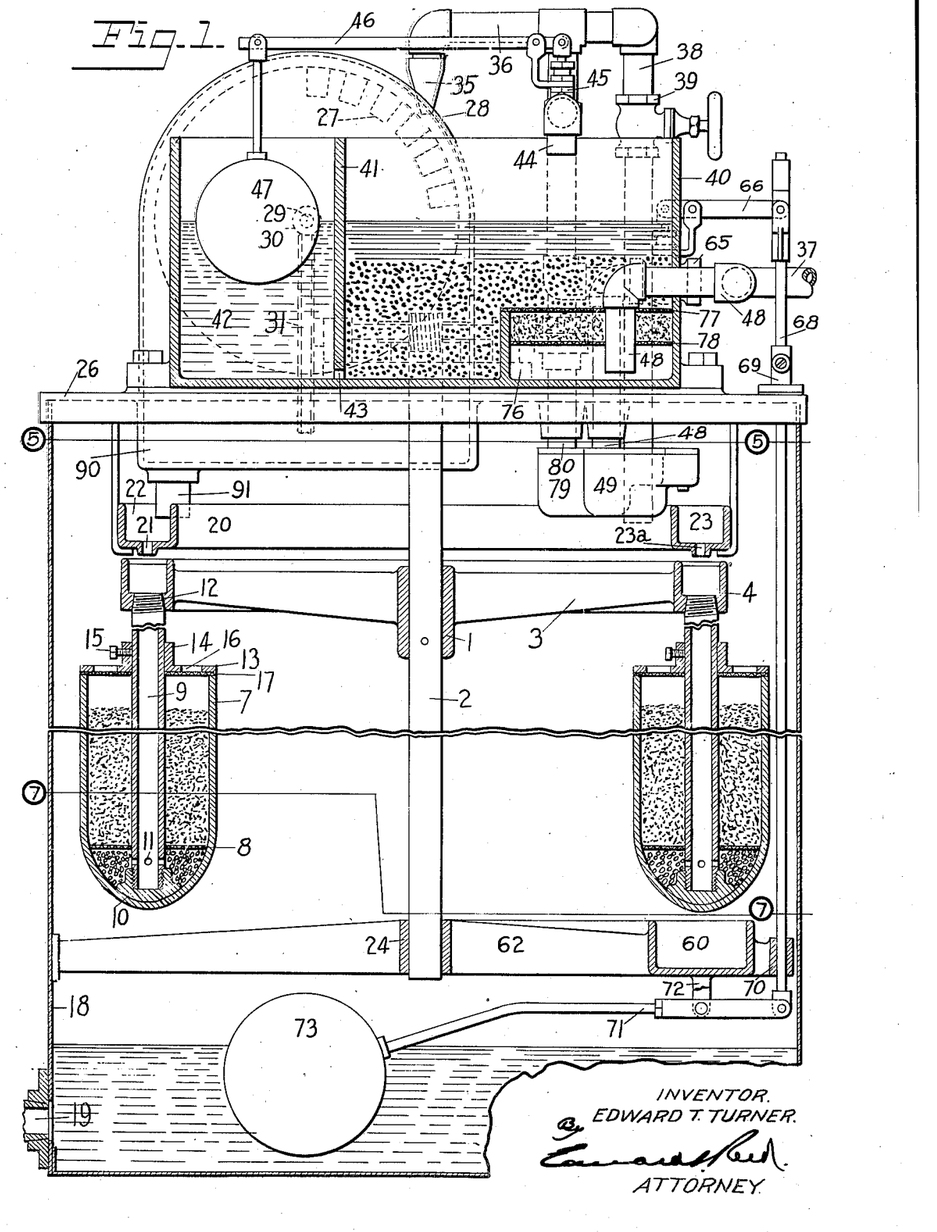
Fig. 1 is a vertical sectional view of a mechanism embodying my invention.
Figure 2:
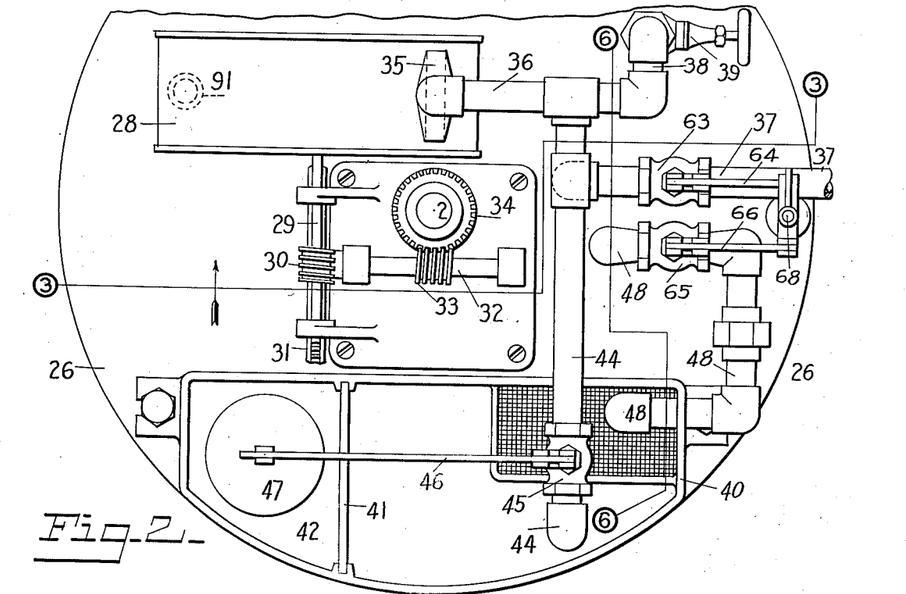
Fig. 2 is a top plan view of the same, partly broken away.
Figure 3:
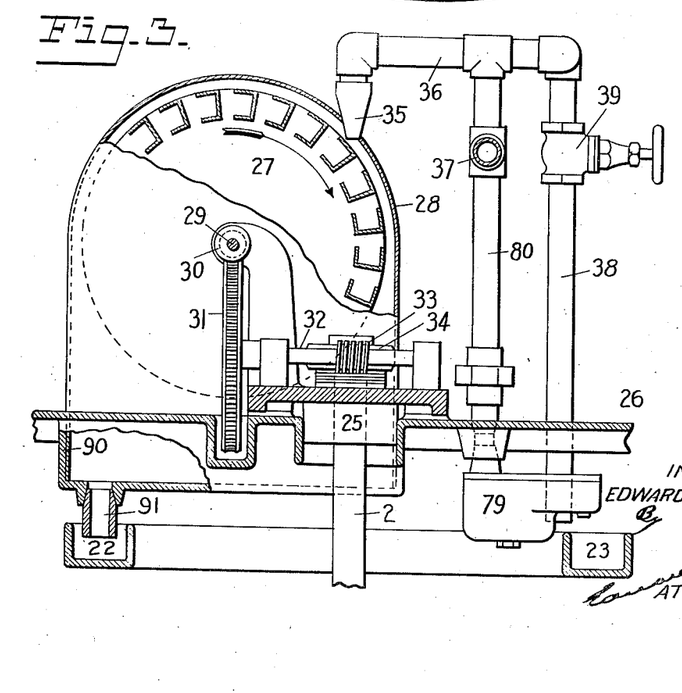
Fig. 3 is a section taken on the line 3—3 of Fig. 2, partly broken away.

In the present mechanism the device comprises what may be termed a water softening apparatus consisting of a plurality of water softening devices, and a delivery apparatus having means for delivering water to be softened to a part of the water softening devices and a regenerating solution to another part of the water softening devices. One of these apparatuses, in the present instance the water softening apparatus, is movable relatively to the other so that the several water softening devices will be brought successively into such relation to the delivery apparatus that they will alternately receive water to be softened and a regenerating solution. In that particular form of the mechanism here shown the several water softening devices are arranged in annular series and are mounted for rotation about an axis arranged centrally of the series. To this end I have provided a rotatable supporting structure which, in the present instance, comprises a spider having a hub portion 1 rigidly secured to a vertical shaft 2 and provided with radial arms 3, the outer ends of which are connected by an annular member 4 which serves to support the several water softening devices and which is trough-shaped in character, so that it also constitutes a receiving device for the water and regenerating solution which is to be delivered to the water softening devices. Preferably this trough-like structure is divided, by means of partitions 5, into a plurality of receptacles 6, there being preferably one such receptacle for each water softening device. Each water softening device comprises a container or outer shell 7 adapted to contain water softening material, such as zeolite or glauconite, and which is provided with means for causing the water and regenerating solution to pass through that material. The particular water softening device shown in Fig. 1 is of the upward flow type and the container 7 is provided near its lower end with a transverse partition 8 of foraminous material which divides the same into two compartments. The lower compartment is preferably filled with gravel while the upper compartment contains the bed of water softening material, which is supported by the partition 8. A supply pipe 9 extends into the container 7 and has its discharge opening arranged beneath the partition 8 in the bed of gravel so that the liquid discharged therefrom will be distributed by the gravel and caused to pass upwardly in substantially uniform quantities through all parts of the water softening material. In the present arrangement the pipe 9 extends into the container through the top thereof and also serves to support the container from the annular supporting member 4. To this end the container is here shown as provided in the lower compartment thereof with a socket member 10 having a socket into which the lower end of the pipe 9 is screwed. This pipe is provided at a point above the socket member 10, but below the partition 8, with outlet openings 11 through which the liquid may escape into the gravel. The upper end of the pipe 9 extends above the top of the container 7 and is screw threaded into an opening 12 in the bottom wall of the trough-like supporting member 4 so that it is in open communication with one of the receptacles of that supporting member. As shown the pipe 9 is connected with the receptacle 6 substantially midway between the ends of that receptacle. The container is preferably provided with a closure and, as here shown, this closure is in the form of a disk 13 arranged to engage the upper edge of the container and is provided with a central opening surrounded by a boss 14 through which the pipe 9 extends. A set screw 15 extends through the boss 14 and engages the pipe 9 to retain the closure firmly in contact with the container. The liquid which is delivered into the lower part of the water softening device by the pipe 9 passes upwardly through the material in the container and is discharged therefrom near the upper end thereof. The discharge opening may be arranged in any suitable location but, as here shown, the closure or top plate 13 has an annular series of openings 16 which are preferably spaced both from the wall of the container and from the pipe 9. These openings may, if desired, be closed by a suitable screen or the like, as shown at 17, to prevent the water softening material from floating off with the water. The softened water which is discharged from the container 7 may be disposed of in any suitable manner. In the present instance it flows downwardly over the outer surface of the container and is discharged from the lower end thereof. The lower portion of the container is preferably tapered or so shaped that the water flowing downwardly over the outer surface thereof will flow to a common point from which it will be discharged in a stream. The purpose of the arrangement will hereinafter appear. The soft water from the container is preferably discharged into a suitable receptacle and, in the present instance, the water softening apparatus is enclosed in a casing or tank 18, the lower portion of which constitutes a receptacle for soft water and is provided with an outlet pipe 19 which may lead to the service pipes or to any other suitable point of delivery. When the water softening mechanism is mounted in an elevated position the water may flow from this receptacle through the service pipes by gravity, or, if the mechanism is not mounted in an elevated position, the water may be distributed by means of a power operated pump, as is customary in domestic water distribution systems. There may be any suitable number of water softening devices, but, in the present instance, I have shown twelve and the several devices are identical in construction.

Arranged above the water softening apparatus is a delivery apparatus which is adapted to deliver hard water to those water softening devices which are operating to soften water and to deliver regenerating solution to that water softening device, or those devices, in which the water softening material is being regenerated. The delivery apparatus may be of any suitable character and may consist of any suitable number of parts, and, as here shown, this delivery apparatus is in the form of an annular trough 20 arranged above the annular supporting member 4 of the water softening apparatus and having a series of outlets 21 arranged to discharge into the several receptacles 6 of the supporting structure. This annular trough-like member is divided into two compartments the larger of which, as shown at 22, is adapted to receive the water to be softened and to deliver it to the inlet receptacles for the water softening devices. The smaller compartment 23 is adapted to receive the regenerating solution and deliver it to the water softening device or devices which are to be regenerated and, in the present instance, this compartment 23 has a single outlet opening, as shown at 23a. The delivery apparatus is, in the present mechanism, stationary and may be supported in any suitable manner.

The water softening apparatus may be rotated in any suitable manner to cause the several inlet receptacles to be brought successively into a position to receive the regenerating solution. As here shown the vertical shaft 2 is journaled at its lower and upper ends in bearings 24 and 25 and is preferably rotated by means of a suitable motor. In the present mechanism I have provided a water motor for this purpose and utilize the incoming water to be softened for actuating this water motor. The motor and its cooperating parts may be mounted on any suitable supporting structure and in any desired relation to the mechanism as a whole, but, in the present instance, the tank 18 is provided with a closure 26 for the upper end thereof and the motor and its associated parts are mounted on this closure. The water motor here shown comprises a water wheel 27 mounted within a casing 28 and rigidly secured to a shaft 29 to which is rigidly secured a worm 30 meshing with a worm wheel 31 on a shaft 32 which is provided with a second worm 33 meshing with a worm wheel 34 rigidly secured to the shaft 2, the upper end of which projects above the closure 26. In this manner the rotatory movement of the water wheel is transmitted at a greatly reduced speed to the softening apparatus and this apparatus is caused to rotate very slowly beneath the delivery apparatus. Water is introduced into the casing 28 and against the buckets or paddles of the water wheel through a nozzle 35 which is carried by a pipe 36 connected with a main supply pipe 37 which may lead to the city water main or to any other suitable source of supply. The water discharged from the nozzle 35 against the water wheel passes over the wheel and downwardly through the casing 28 into a shallow tank 90 which, in the present instance, is supported beneath and connected with the closure 26 for the casing 18 and this shallow tank 90 has a discharge pipe 91 arranged to deliver into the hard water compartment of the delivery apparatus 20. In order that the quantity of water delivered to the water softening apparatus may be varied without causing the speed of rotation of the water softening apparatus to be varied, I have connected with the pipe 36 a by-pass pipe 38 which extends downwardly therefrom and is arranged to discharge into the water receiving portion of the delivery apparatus. The pipe 38 is provided with a valve 39 by means of which the flow of water therethrough may be regulated.

The regenerating solution usually consists of salt water, although it may, of course, be of any suitable character to adapt it to regenerate the particular water softening material which is being used. This salt water or brine is produced in a tank supported adjacent to the water softening apparatus and is delivered thereto in regulated quantities, in any suitable manner. As here shown, a tank 40 is mounted on the closure 26 for the main tank 18 and is divided by a partition 41 into two compartments, the larger of which is adapted to contain a quantity of salt and the smaller of which constitutes a float chamber, as shown at 42, and is connected with the larger compartment by means of an opening 43 in the lower part of the partition 41. This opening is of small size and will prevent the salt from entering the float chamber to such an extent that it will interfere with the mechanism. Water is delivered to the larger compartment through a water pipe 44 connected with the main supply pipe 37. The flow of water through the pipe 44 to the salt tank is controlled by a valve 45 which is operatively connected with a lever 46 to which a float 47 is also connected, this float being arranged in the float chamber 42. A part of the water admitted to the salt chamber will, of course, enter the float chamber and will rise therein to the same level that the water rises in the salt chamber. The float is so adjusted in the present instance that when the water in the salt chamber rises a short distance above the normal level of the salt therein the float will actuate the lever 46 to close the valve 45, thereby interrupting the flow of water to the salt chamber. When the level of water in the float chamber is materially lowered the float will descend and cause the valve to be opened to admit additional water. The salt solution is discharged from the tank through an outlet pipe 48 which extends through the side of the tank 40, and thence downwardly to a point adjacent to the delivery apparatus 20 where it is provided with a regulating device to control the flow of the solution to the delivery apparatus, as shown at 49. In order to prevent the salt from entering the discharge pipe 48 I have interposed a filtering device between the salt bed and the intake end of the pipe to separate the undissolved salt from the solution before it reaches the pipe. As here shown, I have arranged in the bottom of the salt receptacle a shallow chamber 76 which, if desired, may be formed integral with the salt receptacle, and I have provided this chamber with two screens, as shown at 77 and 78, the two screens being spaced some distance apart and the lower screen being spaced some distance above the bottom of the chamber. Between the two screens I interpose a suitable filtering material, such as sand, while the space beneath the lower screen is adapted to receive the filtered solution and the intake end of the pipe 48 extends through the filter into this lower part of the chamber. In the present mechanism I have provided a salt tank 40 of relatively small capacity and have therefore shown the same as mounted on the tank 18 which in effect constitutes a supporting frame for the mechanism. If a salt tank of large capacity is used it will ordinarily be mounted independently of the mechanism as a whole and connected therewith through suitable pipes. By using a tank of large capacity sufficient salt can be placed therein to supply regenerating solution over a long period of time.

Figure 8:
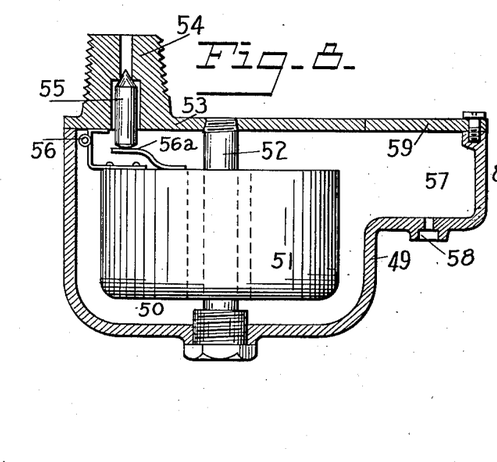
Fig. 8 is a sectional detail view of one of the devices for controlling the flow of regenerating solution to the delivery apparatus.

The regulating device which controls the flow of salt solution to the delivery chamber 23 of the delivery apparatus, may be of any suitable character but, in the present instance, I have shown the same at 49 as comprising an apparatus somewhat in the nature of a carburetor. This apparatus comprises a main chamber 50 having mounted therein a float 51 which is provided with a relatively large opening through which extends a guide rod 52, which rod also serves to secure to the receptacle 50 a closure 53. The float chamber is connected with the pipe 48 for the salt solution and, in the present instance, the closure 53 is provided with a nipple 54 by means of which this connection may be established and the passageway through this nipple is controlled by a needle valve 55 which rests upon and is supported by a part, such as a finger 57ª, carried by the float 51. The float is preferably hinged to the closure 53, as shown at 56, so as to maintain the finger 57ª always in line with the valve 55, the opening through the float being of sufficient diameter to permit the float to have a certain amount of lateral movement with relation to the guide rod 52. The float chamber 50 is provided near its upper end and at one side thereof with a laterally extending portion 57, of small diameter, which is provided with an outlet opening 58 arranged to discharge the liquid into the delivery apparatus. If desired, this laterally extending portion of the chamber may be closed by a separate closure or plate 59, which is detachably secured thereto. By means of this float controlled discharge device a constant level of liquid is maintained in the float chamber 50 and consequently the liquid will be discharged through the outlet 58 in uniform quantities.

The salt solution enters the water softening device, passes through the same and is discharged therefrom in the same manner as the water which is to be softened. To prevent the salt water from entering the soft water receptacle I have arranged beneath the water softening apparatus, adjacent to the salt chamber 23 of the delivery apparatus, a discharge receptacle or trough 60 which is so arranged that the salt solution dripping from the lower end of the container 7 will enter the same and will be carried off through a drain pipe 61. By so shaping the container 7 of the water softening device that liquid will be discharged therefrom at a single point, as above described, I am enabled to use a relatively narrow discharge trough without danger of the salt solution entering the soft water receptacle. In the present arrangement this discharge trough 60 is carried by a spider 62 which also carries the bearing 24 for the vertical shaft 2. The discharge receptacle is so arranged that the water softening device which is in a position to receive salt solution will be moved into a position above the discharge chamber before any of the salt water can escape therefrom. The discharge trough extends somewhat beyond the end of the salt water chamber 23 of the delivery aparatus so that after the water softening material in the water softening device has been regenerated and hard water is again introduced into the same this water will also be discharged into the trough 60 for a period of time sufficient to thoroughly rinse out the water softening device and remove all salt and sediment therefrom so that when the water softening device moves beyond the end of the discharge trough 60, thereby causing the water discharged therefrom to enter the soft water receptacle, it is in a condition to deliver clean soft water.

Figures 4, 5, 6:
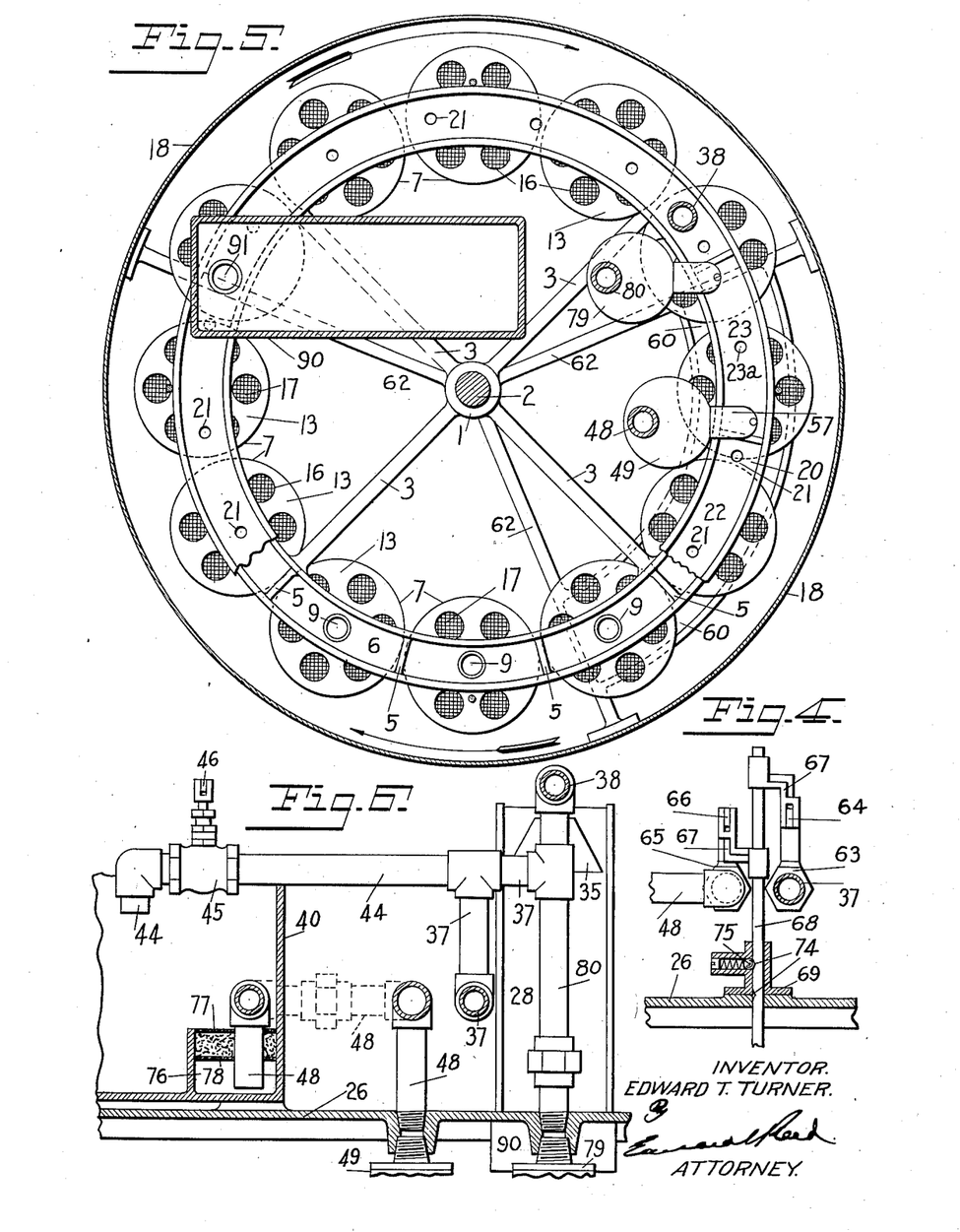
Fig. 4 is a detail view of the automatically controlled valves for controlling the supply of water and regenerating solution to the water softening devices.
Fig. 5 is a section taken on the line 5—5 of Fig. 1.
Fig. 6 is a section taken on the line 6—6 of Fig. 2.
Figure 7:
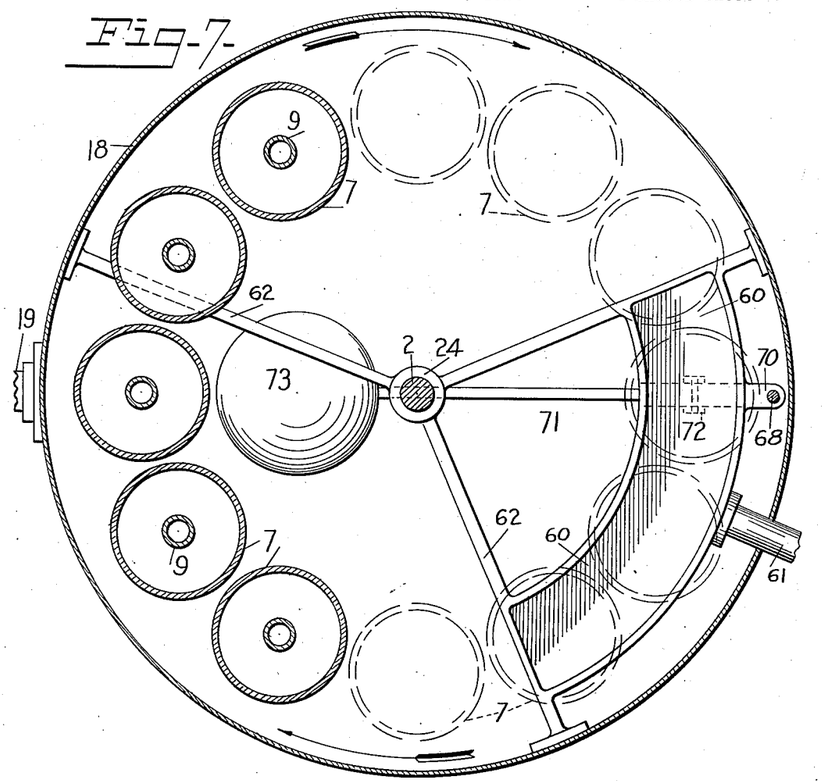
Fig. 7 is a transverse section taken on the line 7—7 of Fig. 1.

It is, of course, desirable that the mechanism should operate to soften water only in such quantities as may be needed and I have therefore provided means controlled by the quantity of water in the soft water receptacle to control the admission of hard water to the softening apparatus and the admission of regenerating solution to the delivery apparatus. To this end the supply pipe 37 is provided with a valve 63 which is actuated by a lever 64 and the discharge pipe 48 for the salt tank is provided with a valve 65 which is controlled by a lever 66. These levers are pivotally connected with brackets 67 (Fig. 4) carried by an actuating rod 68 which is slidably mounted in a bearing 69 on the closure 26 of the tank 18 and in a bracket 70 carried by the discharge trough 60. At its lower end this actuating rod is connected with one end of a lever 71 pivotally mounted on a bracket 72 carried by the discharge trough 60. A float 73 secured to the other end of the lever 71 is raised and lowered as the water in the soft water receptacle rises and falls, thereby causing the valves 63 and 65 to be opened or closed according to the direction of movement of the float. In order that the valves may be opened and closed quickly I have shown (Fig. 4) that portion of the actuating rod 68, which passes through the bearing 69, as provided with recesses 74 adapted to be engaged by a spring actuated detent 75 carried by the bearing which serves to retard the movement of the rod and prevent its operation until the pressure on the same is sufficient to overcome the action of the detent and when the action of the detent is overcome the rod will be quickly moved in a direction to fully open or close the valves as the case may be.

It may sometimes be found desirable to dilute the salt solution before it is delivered to the water softening devices and when this is desired fresh water may be delivered to the salt solution chamber 23 of the delivery apparatus in regulated quantities. Preferably I accomplished this by providing a second regulating device 79, similar to the regulating device 49 and connecting the same by means of a pipe 80 with the water supply pipe 37.

Figure 9:
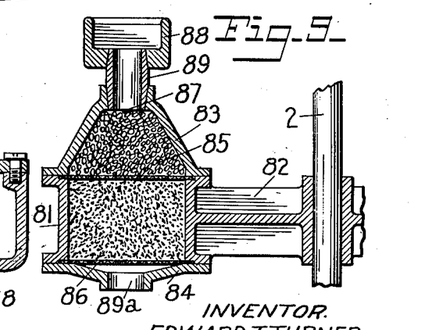
Fig. 9 is a sectional detail view of a modified form of water softening device.

While I have above described a form of water softening apparatus of the up-flow type it will be readily understood that the water softening units may be of any suitable type and in Fig. 9 I have illustrated a water softening unit of the down-flow type, which could be readily substituted for the other units shown. As there shown the water softening unit comprises a cylindrical body portion 81 which, in the present instance, is cast integral with the supporting structure 82 which is carried by the rotatable shaft 2. This cylinder is provided at its upper and lower ends with heads or closures 83 and 84, respectively. The upper closure 83 is dome-shaped in character and is separated from the body portion 81 by means of a foraminous partition 85. The lower head 84 is slightly dished or concave in shape and is separated from the body portion 81 by a foraminous partition 86. The space between the two partitions 85 and 86 is filled with water softening material while the space above the upper partition 85 is filled with gravel. The dome-shaped upper head 83 is provided with an inlet 87 with which is associated an inlet receptacle 88 which is connected therewith by means of a short pipe 89. The lower head 84 is provided with a discharge opening 89a which may discharge into the soft water receptacle or other receiving device.

The operation of the device will be readily understood from the foregoing description of the several parts thereof but may be briefly stated as follows: The hard water in the city main or other source of supply is delivered by the nozzle 35 into the casing 28 and against the water wheel 27. After it passes over the water wheel it is discharged to the tank 90 and thence to the hard water compartment 22 of the delivery apparatus 20. The action of the water on the water wheel rotates the shaft 2 and causes the annular series of water softening devices to travel about the axis of that shaft. At the same time water is delivered to the salt tank 40, under the control of the float operated valve 45, and this water passes through the bed of salt in the salt tank and is thereby thoroughly saturated with salt after which it passes through the outlet pipe 48 to the regulating device 49 and thence to the salt solution compartment 23 of the delivery apparatus 20. The inlet receptacles 6 for the several water softening devices or units are all but one in positions to receive the hard water from the delivery apparatus, but one inlet receptacle is always in a position to receive the salt water. As the water softening apparatus as a whole is rotated this one inlet receptacle is carried beyond the salt water outlet 23a and into a position to receive hard water from the compartment 22 of the delivery apparatus and at the same time the succeeding inlet receptacle is brought into a position to receive salt water. The inlet receptacle of the first mentioned water softening device or unit having been moved beyond the salt solution delivery opening 23a will then receive hard water, which passes through the same washing out the salt and sediment. The water discharged from the device during this washing out operation is delivered to the discharge trough 60. This trough is of such a length that by the time the water softening device has passed beyond the end of the trough it has been thoroughly rinsed out and the water discharged therefrom is in a condition to be delivered to the soft water receptacle. When the soft water accumulates in the soft water receptacle 18 to the desired height, which is always below the top of the discharge trough 60, the float 73 will operate to close the valves 63 and 65 controlling, respectively, the water supply and the salt solution supply, thus interrupting the flow of these liquids through the delivery apparatus and as soon as the water in the tank 90 and the salt solution in the regulating device 49 have been exhausted the mechanism will cease to operate. As the soft water is drawn off from the outlet 19 the float 73 will move downwardly and will eventually open the valves 63 and 65 to again admit water and salt solution to the delivery apparatus and the water softening operation is resumed.

It will be apparent therefore that I have provided a water softening apparatus which is continuous in its operation and which will provide at all times a liberal supply of soft water and, if a sufficient supply of salt is placed in the salt tank it will continue to operate indefinitely under automatic control and without attention on the part of the user.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a water softening mechanism, a plurality of water softening devices of relatively small capacity, and means controlled by the water passing through said mechanism for delivering water to be softened to a relatively large number of said water softening devices, for delivering regenerating solution to a relatively small number of water softening devices and for causing regenerating solution to be delivered successively to the several water softening devices.

2. In a water softening mechanism, a plurality of water softening devices of relatively small capacity, means for delivering water to be softened to a relative large number of said water softening devices and for delivering regenerating solution to a relatively small number of said water softening devices, and means controlled in accordance with the quantity of water delivered to said water softening devices for causing each water softening device to receive water to be softened during one period of operation and to receive regenerating solution during another period of operation.

3. In a water softening mechanism, a plurality of water softening devices, means to deliver water to be softened to a part of said water softening devices and to deliver regenerating solution to another part of said water softening devices, and means controlled by the soft water discharged from said water softening devices for controlling the delivery of water to be softened and of regenerating solution to the water softening devices.

4. In a mechanism of the character described, an apparatus comprising a plurality of water softening devices, a second apparatus comprising means for separately delivering water to be softened and regenerating solution to said water softening devices, one of said apparatuses being movable with relation to the other to cause each of said water softening devices to receive water to be softened during one period of operation and to receive regenerating solution during another period of operation.

5. In a mechanism of the character described, an apparatus comprising a plurality of water softening devices each having an inlet, a second apparatus comprising separate compartments each having a discharge opening, a part of said compartments being adapted to contain water to be softened and a part of said compartments being adapted to contain a regenerating solution, and means for moving one of said apparatuses with relation to the other to cause the inlet of each water softening device to be alined successively with the discharge openings of said compartments.

6. In a mechanism of the character described, an apparatus comprising a plurality of water softening devices and a second apparatus comprising means for separately delivering water to be softened and regenerating solution to said water softening devices, the first mentioned apparatus being movable with relation to said second apparatus to cause each water softening device to be moved first into a position to receive water to be softened and then into a position to receive regenerating solution.

7. In a mechanism of the character described, an apparatus rotatable about a central axis and comprising a plurality of water softening devices each having an inlet, a stationary delivery apparatus having a plurality of outlets, a part of said outlets being adapted to deliver water to be softened to said water softening devices and another part of said outlets being adapted to deliver regenerating solution to said water softening devices.

8. In a mechanism of the character described, a delivery apparatus having a plurality of outlets, a rotatable supporting structure, a plurality of water softening devices carried by said supporting structure and each having an inlet, and means for actuating said rotatable supporting structure to cause said inlets to be moved successively into positions to receive liquid from different outlets of said delivery apparatus.

9. In a mechanism of the character described, an annular receptacle comprising two compartments, one of said compartments being of relatively short length and both compartments having outlet openings, a rotatable structure arranged beneath said annular receptacle, a plurality of water softening devices carried by said rotatable structure and each having an inlet arranged to be moved successively into line with each of the outlets in said annular receptacle, and means for actuating said rotatable structure.

10. In a mechanism of the character described, an annular receptacle comprising two compartments, one of said compartments being of relatively short length and both compartments having outlet openings, a rotatable structure comprising an annular member arranged beneath said annular receptacle and provided with a plurality of receptacles, a plurality of water softening devices supported by said rotatable structure and communicating with the respective receptacles therein, and means for rotating said supporting structure.

11. In a mechanism of the character described, a delivery apparatus comprising two compartments and provided with outlet openings arranged in annular series, a rotatable supporting structure comprising an annular trough-ike member divided into a plurality of compartments, pipes screw threaded into the bottom wall of each of said compartments and communicating with said compartment, a container carried by said pipe and in open communication therewith, water softening material arranged within said container, and means for rotating said supporting structure.

12. In a mechanism of the character described, an apparatus comprising a plurality of water softening devices, a second apparatus comprising means for separately delivering water to be softened and regenerating solution to said water softening devices, one of said apparatuses being movable with relation to the other to cause each of said water softening devices to receive water to be softened during one period of operation and to receive regenerating solution during another period of operation, and power operated means for actuating said movable apparatus.

13. In a mechanism of the character described, an apparatus comprising a plurality of water softening devices, a second apparatus comprising means for separately delivering water to be softened and regenerating solution to said water softening devices, one of said apparatuses being movable with relation to the other to cause each of said water softening devices to receive water to be softened during one period of operation and to receive regenerating solution during another period of operation, means for supplying water to be softened to said second apparatus, and a device arranged to be actuated by the water so supplied to impart movement to said movable apparatus.

14. In a mechanism of the character described, an apparatus comprising a plurality of water softening devices, a second apparatus comprising means for separately delivering water to be softened and regenerating solution to said water softening devices, one of said apparatuses being movable with relation to the other to cause each of said water softening devices to receive water to be softened during one period of operation and to receive regenerating solution during another period of operation, a water motor operatively connected with said movable apparatus, and means for supplying water to said water motor, the outlet of said water motor leading to said delivery apparatus.

15. In a mechanism of the character described, a rotatable supporting structure, a plurality of water softening devices carried by said supporting structure, a delivery apparatus having means for separately delivering water to be softened and regenerating solution to said water softening devices, a tank arranged to supply water to said delivery apparatus, a supply pipe to deliver water to said tank, and a water wheel arranged to be actuated by the water from said supply pipe and operatively connected with said rotatable structure.

16. In a mechanism of the character described, a rotatable supporting structure, a plurality of water softening devices carried by said supporting structure, a delivery apparatus having means for separately delivering water to be softened and regenerating solution to said water softening devices, a tank arranged to supply water to said delivery apparatus, a supply pipe to deliver water to said tank, a water wheel arranged to be actuated by the water from said supply pipe and operatively connected with said rotatable structure, and means controlled by the water discharged from said water softening devices to control the supply of water to said water wheel.

17. In a mechanism of the character described, a water softening apparatus comprising one or more water softening devices, a second apparatus comprising means for separately delivering water to be softened and a regenerating solution to said water softening devices, means for moving one of said apparatuses with relation to the other to cause regenerating solution to be delivered successively to each of the water softening devices, a discharge receptacle mounted in fixed relation to the means for delivering regenerating solution to said water softening devices and arranged to receive the regenerating solution when it is discharged from said water softening devices.

18. In a mechanism of the character described, a water softening apparatus comprising one or more water softening devices, a second apparatus comprising means for separately delivering water to be softened and a regenerating solution to said water softening devices, means for moving one of said apparatuses with relation to the other to cause regenerating solution to be delivered successively to each of the water softening devices, a discharge receptacle mounted in fixed relation to the means for delivering regenerating solution to said water softening devices and arranged to receive the regenerating solution when it is discharged from said water softening devices, said discharge receptacle extending beyond said delivery means for regenerating solution and being arranged to receive the liquid from each water softening device for a limited period after the delivery of regenerating solution thereto has been interrupted and said water softening device is again receiving water to be softened.

19. In a mechanism of the character described, a water softening apparatus comprising a plurality of water softening devices, a second apparatus having means for separately delivering water to be softened and regenerating solution to said water softening devices, means for moving one of said apparatuses with relation to the other to cause regenerating solution to be delivered successively to the several water softening devices, said water softening devices having means to cause the water and regenerating solution to be discharged from the lower ends thereof, a soft water receptacle arranged beneath said water softening device, a discharge receptacle arranged beneath said water softening devices and mounted in fixed relation with the means for delivering said regenerating solution to said water softening devices, a pipe for supplying water to be softened to said delivery apparatus, a second pipe for delivering regenerating solution to said delivery apparatus, separate valves to control the flow of liquid through said pipes, a float mounted in said soft water receptacle, and means controlled by said float to actuate said valves.

20. In a mechanism of the character described, a water softening device, means for delivering water to be softened to said water softening device, a source of supply for regenerating solution, and means for conducting said regenerating solution to said water softening device, comprising a chamber connected with said source of supply and having an outlet arranged above the bottom thereof, and leading to said water softening device, a valve to control the connection between said chamber and said source of supply, and a float mounted in said chamber to control said valve.

21. In a mechanism of the character described, a water softening device, means for delivering water to be softened to said water softening device, a source of supply for regenerating solution, a conduit leading from said source of supply, a receptacle connected with said conduit and having a float chamber and also having a laterally extending portion provided with an outlet above the bottom of said receptacle, a valve to control the connection between said conduit and said receptacle, and a float to actuate said valve.

22. In a mechanism of the character described, a water softening apparatus comprising a plurality of water softening devices, a delivery apparatus comprising means for delivering water to be softened to said water softening devices, and other means for delivering a regenerating solution to said water softening devices, means for moving one of said apparatuses with relation to the other to cause regenerating solution to be delivered successively to the several water softening devices, a source of supply for said regenerating solution, means for regulating the flow of regenerating solution to the delivery means for regenerating solution, means for delivering fresh water to the delivery means for said regenerating solution, and means to regulate the flow of fresh water to said delivery means.

23. In a water softening apparatus, a container for water softening material, a pipe to supply hard water to said container during all operating periods of said apparatus, a service line and a drain adapted to receive liquid from said container, means for introducing regenerating solution into hard water delivered to said container from said supply pipe, means controlled by the flow of water through said supply pipe to interrupt the flow of liquid from said container to said service line and to cause liquid to flow from said container to said drain while regenerating solution is being introduced into said container.

24. In a water softening apparatus, a container for a bed of water softening material having an inlet and an outlet on opposed sides of said bed, continuously moving means for causing hard water, regenerating solution and wash water to pass to said inlet through said bed and out said outlet and a motor continuously operating said means and controlling by the rate of its continuous motion the respective durations of said several passages.

25. In a regenerative base exchange water softening mechanism adapted for continuous automatic operation without valves, a series of water softening devices adapted to be supplied with water to be softened, regenerating solution and wash water, a member adapted to supply said liquids to said devices, a continuously operating motor and continuously moving means operated by said motor for effecting relative movement of the supply member and the softening devices to so control the supply to said devices of said water to be softened, regenerating solution and wash water that while regenerating solution is being delivered to a part of said water softening devices wash water will be delivered to another part of said water softening devices and water to be softened will be delivered to a third part of said water softening devices.

26. A base exchange water softening apparatus adapted for valveless regeneration and comprising a casing to contain a bed of water softening material, a service pipe in communication with said casing on one side of said bed of material, a supply pipe in communication with said casing on the other side of said bed of material, means for delivering hard water and regenerating solution to said supply pipe, a drain connection and power operated means moving continuously through all operating periods of said apparatus and adapted to cause passage of regenerating solution, wash water and water to be softened from said delivery means to said supply pipe consecutively and in the order named and to establish and maintain the drain connection during regenerating and washing.

27. In a regenerative base exchange water softening apparatus, a container for a bed of water softening material, a supply device for hard water and regenerating solution having communication with said container on one side of said bed of material during all operative periods of said apparatus, a service conduit receiving softened water discharged from said container on the other side of said bed of material, a motor energized in response to a withdrawal of softened water through said service conduit, and means operated and controlled by said motor for changing the relative positions of said container and said supply device to cause regenerating solution to be delivered to said container for an interval determined by the rate of motion of said motor.

28. In a base exchange water softening apparatus adapted for regeneration without valve operation, a casing containing a bed of water softening material, a supply conduit leading into said casing, a supply device for hard water and regenerating solution, a service line and a drain line to receive liquid from said casing, a motor, and means both operated and controlled by said motor for changing the relative positions of said casing and said supply device, service line and drain line to cause hard water to be softened, regenerating solution and wash water to be consecutively supplied to said supply conduit to be passed through said casing to said service line and said drain line respectively and each for an interval determined by the rate of motion of said motor, said motor operating continuously during all of said operating periods.

29. In base exchange water softening mechanism, an apparatus comprising one or more containers for water softening material with connections adapted to pass liquids therethrough, a second apparatus comprising means for separately delivering water to be softened and regenerating liquid to said first apparatus and means for moving one of said apparatuses with relation to the other to cause water to be softened to pass through said container or containers during one period of operation and to cause regenerating liquid to pass through said container or containers during another period of operation.

30. An automatic regenerative base exchange water softener capable of valveless regeneration and comprising one or more containers for water softening material with connections adapted to pass liquids therethrough, means for delivering water and regenerating liquid to said container connections, receiving means for softened water, separate receiving means for regenerative liquid running from the containers, mechanical means for successively shifting the relative position of the containers with respect to the delivery means and the two receiving means, a motor operating said mechanical means and timing said shifting, and means responsive to liquid movement in the soft water receiving means for stopping and starting the motor.

31. A base exchange water softening apparatus adapted to effect regeneration without valve operation, said apparatus comprising a casing containing a bed of water softening material, means for supplying liquids to said casing on one side of said bed of material, means for delivering softened water from said casing on the other side of said bed of material, a motor operating at a fixed rate, and means continuously moved by said motor for consecutively passing regenerating solution, wash water and water to be softened to said supply means, the fixed rate of movement of said motor determining the period of passage of regenerating solution and then determining the period of passage of wash water.

32. In a water softening apparatus, a container for water softening material, a soft water service pipe having communication with said container, means for alternately delivering hard water and regenerating solution to said container, said means being adapted to effect said alternation of delivery upon change in the relative positions of said container and said delivery means, a motor adapted in continuous operation to change said relative positions, and means operated and timed by the motor in association with said delivery means to terminate and to restore the communication between the service pipe and the container.

33. In a water softening apparatus adapted to soften water at a predetermined fixed rate, a container for water softening material, a feeding device adapted to feed hard water and regenerating solution to said container at alternate intervals upon change in the relative positions of said container and said feeding device and a motor adapted to change said relative positions and to automatically control the frequency and duration of said alternate intervals by its continuous operation at a predetermined fixed rate of motion.

34. A water softening apparatus comprising a container for a bed of water softening material having an inlet and an outlet on opposed sides of said bed, a feeding device adapted to pass water to be softened, regenerating solution and wash water in succession to said container inlet upon change in the relative positions of said container and said feeding device and a motor adapted to change said relative positions and thereby to effect said successive liquid passages.

35. A base exchange water softening apparatus capable of valveless regeneration and comprising a container for water softening material, a supply conduit to and a discharge opening from said container, continuously operating means for consecutively supplying water to be softened, regenerating solution and wash water to said supply conduit and a motor adapted upon continuous operation to operate and to so control said supply means as to determine by the rate of its continuous motion the respective and consecutive durations of passage of water to be softened, regenerating solution and wash water through said container.

36. A regenerative base exchange water softening apparatus capable of valveless operation and adapted to soften water at a continuous fixed rate which comprises one or more containers for water softening material adapted to receive hard water or regenerating solution, a motor arranged to operate continuously at a fixed rate of speed while the apparatus is in operation and means operated and controlled by said motor for delivering hard water and regenerating solution alternately to each container, the respective periods of said alternate deliveries being determined by said fixed rate of operation of said motor.

37. In a water softening apparatus adapted to maintain a continuous supply of softened water, a casing to contain a bed of water softening material, a conduit adapted to supply liquids to said casing, outlet means for discharging liquids from said casing, a receptacle for storing softened water discharged from the casing, a motor adapted to be started by a device responding automatically to a withdrawal of softened water from the soft water receptacle, and means operated and controlled by said motor for causing regenerating liquid, wash water and water to be softened to be supplied to said supply conduit consecutively and in the order named, each for an interval determined by the rate of motion of said motor.

EDWARD T. TURNER.